(12) United States Patent
Frischtatzky et al.

(10) Patent No.: US 10,857,607 B2
(45) Date of Patent: Dec. 8, 2020

(54) METHOD FOR GEAR CUTTING OF BEVEL GEAR WORKPIECES

(71) Applicant: Klingelnberg AG, Zürich (CH)

(72) Inventors: Rafael Frischtatzky, Bergisch-Gladbach (DE); Timon Rabanus, Hückeswagen (DE); Karl-Martin Ribbeck, Remscheid (DE)

(73) Assignee: KLINGELNBERG AG

( * ) Notice: Subject to any disclaimer, the term of this patent is extended or adjusted under 35 U.S.C. 154(b) by 22 days.

(21) Appl. No.: 16/246,878

(22) Filed: Jan. 14, 2019

(65) Prior Publication Data
US 2019/0217407 A1    Jul. 18, 2019

(30) Foreign Application Priority Data

Jan. 15, 2018   (EP) .................................. 18151648

(51) Int. Cl.
*B23F 17/00* (2006.01)
*B23F 9/10* (2006.01)
*B23F 5/16* (2006.01)

(52) U.S. Cl.
CPC ............ *B23F 17/003* (2013.01); *B23F 5/163* (2013.01); *B23F 9/10* (2013.01); *B23F 9/105* (2013.01)

(58) Field of Classification Search
CPC ........ B23F 9/10; B23F 9/105; B23F 2075/20; B23F 9/163; Y10T 409/103816;
(Continued)

(56) References Cited

U.S. PATENT DOCUMENTS 4,050,353 A * 9/1977 Bachmann ............... B23F 9/105
                                                                                     409/28
4,865,497 A * 9/1989 Faulstich ................ B23F 5/163
                                                                                     409/12
(Continued)

FOREIGN PATENT DOCUMENTS

| EP | 1518630 A1 | 3/2005 |
| EP | 2412467 A1 | 2/2012 |
| EP | 2535134 A1 | 12/2012 |

OTHER PUBLICATIONS

Search Report for Application No. EP18151648, dated Jul. 18, 2018, 7 pages.
(Continued)

*Primary Examiner* — Nicole N Ramos
(74) *Attorney, Agent, or Firm* — McCarter & English, LLP

(57) ABSTRACT

Method for gear cutting a bevel gear workpiece, wherein a preliminary machining phase includes
   a first machining procedure, wherein
   a first relative infeed movement moves the gear cutting tool into a first starting position relative to the bevel gear workpiece,
   the gear cutting tool penetrates the material of the bevel gear workpiece relative to the bevel gear workpiece, proceeding from the first starting position up to a first end position, and
   the gear cutting tool and bevel gear workpiece carry out a first rolling procedure in a first rolling range,
   carrying out a further rolling procedure, in order to post-machine at least one of the tooth gaps on the bevel gear workpiece using the rotationally-driven gear cutting tool or another rotationally-driven gear cutting tool, wherein in the scope of this further rolling, a
(Continued)

rolling rotation is carried out in a further rolling range, which differs from the first rolling range.

18 Claims, 5 Drawing Sheets

(58) Field of Classification Search
CPC . Y10T 409/103975; Y10T 409/104134; Y10T 409/104293
See application file for complete search history.

(56) References Cited

U.S. PATENT DOCUMENTS

| | | | | |
|---|---|---|---|---|
| 5,255,475 A * | 10/1993 | Kotthaus | ............... | B23F 17/001 451/548 |
| 5,310,295 A * | 5/1994 | Palmateer, Jr. | ........... | B23F 9/10 409/13 |
| 5,716,174 A * | 2/1998 | Stadtfeld | ................ | B23F 9/025 409/26 |
| 6,050,883 A * | 4/2000 | Wiener | ................... | B23F 9/025 451/47 |
| 7,156,718 B2 * | 1/2007 | Blasberg | ................ | B23F 9/025 451/47 |
| 9,033,625 B2 * | 5/2015 | Stadtfeld | ................ | B23F 9/025 409/39 |
| 9,649,707 B2 * | 5/2017 | Stadtfeld | ................ | B23F 9/105 |
| 9,782,848 B2 * | 10/2017 | Stadtfeld | ................ | B23F 19/10 |
| 2011/0103911 A1 * | 5/2011 | Stadtfeld | ................... | B23F 9/08 409/26 |
| 2018/0056416 A1 * | 3/2018 | Ribbeck | ................... | B23F 19/00 |
| 2018/0085839 A1 * | 3/2018 | Yoon | .................... | B23F 19/102 |
| 2018/0264568 A1 * | 9/2018 | Weber | .................. | B23F 19/005 |

OTHER PUBLICATIONS

Klingelnberg, J., "Bevel Gear," Springer Vieweg, Berlin, Heidelberg, 2016, pp. 64-67 and 252-255.

* cited by examiner

METHOD FOR GEAR CUTTING OF BEVEL GEAR WORKPIECES

CROSS-REFERENCE TO RELATED APPLICATIONS

This application claims priority under 35 U.S.C. §§ 119 (a)-(d) to European patent application no. EP 18 151 648.5 filed Jan. 15, 2018, which is hereby expressly incorporated by reference as part of the present disclosure.

FIELD OF THE INVENTION

The subject matter of the present disclosure relates to methods for gear cutting of bevel gear workpieces.

BACKGROUND

There are various approaches for the gear cutting of bevel gears and hypoid gears. These include, for example, milling and grinding.

In addition, single indexing method and continuous indexing methods are differentiated. In a single indexing method, the corresponding method steps are repeated multiple times (in accordance with the number of the gaps). In the continuous approach, in contrast, all tooth gaps are machined in one pass.

During the rolling of gear teeth, a specific rolling range has to be passed through (rolled through) to generate the profile of the tooth flanks, wherein the direction of the rolling movement between gear cutting tool and workpiece can be selected from the toe to the heel of the workpiece or from the heel to the toe. This rolling range is defined by starting angle and end angle and the starting angle of this range is referred to here as the starting profile rolling angle and the end angle as the end profile rolling angle. The starting profile rolling angle and the end profile rolling angle define the rolling range, in which points of the tooth flank profile are still just generated by the gear cutting tool. The range between these profile rolling angles (rolling positions) can be referred to as the profile rolling range. There is a profile rolling angle for the toe (called profile rolling angle toe) and a profile rolling angle for the heel (called profile rolling angle heel) of the workpiece.

The respective profile rolling range results from the geometrical properties of the bevel gear to be cut and from the process which is used for the gear cutting. I.e., the profile rolling range is a dimension which can be ascertained by computer, for example, in the scope of the design. The profile rolling range is therefore a fixed process dimension of the gear cutting process of the respective bevel gear. Depending on the process which is used for the gear cutting of bevel gears and hypoid gears, the rolling path can even be somewhat longer according to the prior art, in order to specify a small safety interval.

There are points or regions in a tooth gap which are not located on the final tooth profile and are not removed solely by a rolling movement within the profile rolling range. Their location is dependent on the rolling start and the rolling direction. In order to remove material of the workpiece in these regions, either a plunging movement is selected, in which material is removed on the workpiece (called plunge rolling) or a larger rolling range is selected. The rolling angles, which delimit this larger range, are defined by a rolling-in angle and a profile rolling angle. The rolling-in angle is the rolling angle in which the tool first begins to remove material on the workpiece in the case of solely a rolling movement. This initial contact takes place on the head cone of the workpiece and depending on the rolling direction (in the case of rolling from the toe to the heel) at the toe of the workpiece (rolling-in angle toe) or (in the case of rolling from the heel to the toe) at the heel of the workpiece (rolling-in angle heel).

A further point on the rolling path or in the rolling range is the so-called rolling middle. By definition, this is the rolling angle at which the design point of the gear teeth is generated. It does not have to be located exactly in the middle of the rolling pass between profile rolling angle toe and profile rolling angle heel.

The following processes are some examples of processes that may be used for gear cutting of bevel gears and hypoid gears:

Rolling in: In this case, no plunging movements occur, during which material is removed. The gear cutting is performed only by rolling. It is therefore solely a rolling process. The gear cutting tool is moved to full depth in rapid traverse outside the engagement with the workpiece. Outside the engagement means here that a rolling position on the rolling-in angle toe (in the case of rolling from the toe to the heel) or on the rolling-in angle heel (in the case of rolling from the heel to the toe), respectively, plus a small safety interval is approached on the rolling path. The rolling movement begins from here, i.e., the respective rolling-in angle (plus a safety interval) defines the rolling start. The rolling movement then takes place up to the corresponding profile rolling angle heel (in the case of rolling from the toe to the heel) or up to the corresponding profile rolling angle toe (in the case of rolling from the heel to the toe). The speed of the rolling movement can be constant or variable over the rolling path in the case of this rolling process. At the rolling end (for example, at the profile rolling angle heel), the gear cutting tool is moved out of the gap. If this rolling process is executed as a single indexing method, the indexing movement now takes place and the described procedure is repeated gap-by-gap.

Plunging rolling: Plunging rolling is a plunging-rolling process. Piercing or plunging takes place here at the rolling start. Depending on the rolling direction, this piercing takes place at the profile rolling angle toe (in the case of rolling from the toe to the heel) or at the profile rolling angle heel (in the case of rolling from the heel to the toe). Piercing (also called plunging) is performed into the workpiece at the toe or at the heel to the full tooth depth with a safety distance starting in the plunging direction in a piercing movement. If the full tooth depth has been reached, the piercing movement stops and the rolling movement follows. Rolling is the respective profile rolling angle in Plunging rolling (profile rolling angle heel for the rolling direction from the toe to the heel or profile rolling angle toe for the rolling direction from the heel to the toe). The speed of the rolling movement can be constant or variable over the rolling path. At the rolling end, the gear cutting tool is moved out of the gap. If this plunging-rolling process is executed as a single indexing method, the indexing movement now takes place and the procedure is repeated gap-by-gap.

Plunging double rolling: Plunging double rolling is also a plunging-rolling process. Plunging is also performed into the workpiece starting from a rolling position outside the workpiece here and material is removed. For this purpose, the rolling start is located between the profile rolling angle toe and the profile rolling angle heel, but not exactly thereon. The rolling middle is frequently selected for the plunging (also called piercing). The plunging can take place up to the full tooth depth or a small depth allowance is left standing, i.e., the plunging is stopped in the position of the full tooth depth minus a depth allowance. From this point, the rolling movement now takes place in the direction of the toe up to the profile rolling angle toe or in the direction of the heel up to the profile rolling angle heel. If this point is reached, when a depth allowance was left standing, the infeed to full tooth depth takes place, and then a rolling movement in the other direction up to the respective other profile angle. The speed of the rolling movement can be constant or variable over the rolling path. At the rolling end, the gear cutting tool is moved out of the gap. If this plunging-rolling process is executed as a single indexing method, the indexing movement now takes place and the procedure is repeated gap-by-gap.

Double rolling: In this process, no plunging movements in which material is removed take place. The gear cutting is performed only by rolling. It is therefore solely a rolling process. The gear cutting tool is moved in rapid traverse outside the engagement with the workpiece to full depth minus a depth allowance. Outside the engagement means here that a rolling position at the rolling-in angle toe (in the case of rolling from the toe to the heel) or at the rolling-in angle heel (in the case of rolling from the heel to the toe) plus a small safety interval is approached on the rolling path. The rolling movement begins from here, i.e., the respective rolling-in angle (plus the safety interval) defines the rolling start. The rolling movement then takes place up to the corresponding profile rolling angle heel (in the case of rolling from the toe to the heel) or up to the corresponding profile rolling angle toe (in the case of rolling from the heel to the toe). If the corresponding profile rolling angle is reached, a plunging infeed thus takes place up to the depth allowance and subsequently the rolling back up to the respective other profile rolling angle. In this process, the first rolling movement is usually carried out as rough rolling and the second rolling movement as finish rolling. The speed of the rolling movement can be constant or variable over the rolling path. At the rolling end, the gear cutting tool is moved out of the gap. If this rolling process is executed as a single indexing method, the indexing movement now takes place and the procedure is repeated gap-by-gap.

Plunging: This is solely plunging machining in this case and no rolling takes place. This process can be used only for appropriately designed crown wheels. The plunging process starts with a safety interval. The plunging movement takes place from here. It can take place with constant or variable plunging speed or in steps. Subsequently lingering at full tooth depth can also be provided. Free cutting can also be carried out for this purpose. The gear cutting tool is subsequently moved out of the gap. If this plunging process is executed as a single indexing method, the indexing movement now takes place and the procedure is repeated gap-by-gap.

In the processes described above, all rolling processes have a profile rolling angle as the rolling end. The rolling paths, if multiple revolutions take place (for example, plunging in at the toe with a profile rolling angle toe) with depth allowance, rolling up to the profile rolling angle heel, depth infeed at the heel (not to the full tooth depth), rolling up to the profile rolling angle toe, depth infeed to full tooth depth, rolling up to the profile rolling angle heel, movement out of the tooth gap, are also always of equal length.

The rolling path is thus always defined from the difference of the profile rolling angle toe and the profile rolling angle heel. Depending on the process which is used for the gear cutting of bevel gears and hypoid gears, the rolling path can even be longer in methods of the prior art.

Further details of a plunging-rolling process will now be described by way of example and solely schematically on the basis of FIGS. 1A and 1B, wherein in the example shown, a cup grinding wheel 10 is used as a gear cutting tool and wherein this plunging-rolling process comprises two passes per tooth gap. In FIGS. 1A, 1B, only a portion of a cup grinding wheel 10 is shown. Only a portion in the form of a dashed rectangle is shown of the bevel gear workpiece 11, wherein the toe is identified with a Z and the heel with a F. The block arrows indicate the movements of the cup grinding wheel 10 in relation to the bevel gear workpiece 11. The black circles can be understood as points in three-dimensional space, at which the movement direction and/or the type of process or machining changes.

In the process 1 shown here, the cup grinding wheel 10 is infed in relation to the bevel gear workpiece 11 to reach a starting position AP. The corresponding infeed movement is shown in FIG. 1A by an arrow P1. Proceeding from the starting position AP, the cup grinding wheel 10 plunges/pierces frontally into the soft (not hardened) material of the bevel gear workpiece 11. This plunging/piercing takes place here at the profile rolling angle heel, since the example shown relates to Plunging rolling from the heel F to the toe Z. The plunging/piercing is shown by a black arrow P2. In the process shown, in a first pass, which is shown in FIG. 1A, the plunging/piercing does not take place up to the final gap depth of the tooth gap to be machined, but rather an allowance is left standing. The black color of the arrows in FIGS. 1A, 1B indicate procedures in which material is removed on the bevel gear workpiece 11 by grinding (or milling). As soon the cup grinding wheel 10 has plunged in (this position is referred to as the plunging end position TEP), a relative movement (called the rolling procedure) of the cup grinding wheel 10 takes place in relation to the bevel gear workpiece 11, to grind the tooth gap over the entire tooth width of the tooth gap to be generated. The rolling procedure, which is schematically shown in FIG. 1A by a black arrow P3, ends at a rolling end position WEP, which is defined by the profile rolling angle toe. After the rolling end position WEP of the cup grinding wheel 10 in relation to the bevel gear workpiece 11 has been reached in FIG. 1A, the cup grinding wheel 10 is retracted. This occurs at the profile rolling angle toe. This relative retraction movement is shown in FIG. 1A by an arrow P4.

A second pass having plunging/piercing and rolling now follows, as shown in FIG. 1B. During the second pass of the process 1 shown here, the cup grinding wheel 10 is again infed in relation to the bevel gear workpiece 11, to now reach a starting position AP1. The corresponding infeed movement is shown in FIG. 1B by an arrow P5. Proceeding from the starting position AP1, the cup grinding wheel 10 plunges/pierces up to the full depth of the tooth gap into the material of the bevel gear workpiece 11. The plunging/piercing is shown by a black arrow P6. As soon as the cup grinding wheel 10 has plunged to the full depth (this position is also referred to as the plunging end position TEP1), a relative movement (called the rolling procedure) of the cup grinding wheel 10 in relation to the bevel gear workpiece 11 takes place, in order to grind the tooth gap over the entire tooth width of the tooth gap to be generated. The rolling procedure, which is schematically shown in FIG. 1B by a black arrow P7, ends at a rolling end position WEP1, which is defined by the profile rolling angle toe. A withdrawal procedure then takes place, which is illustrated by the black arrow P8.

The bevel gear workpiece can now carry out an indexing rotation and the cup grinding wheel 10 is moved to the starting position. The procedure shown in FIGS. 1A, 1B is then repeated gap-by-gap.

The mentioned rolling procedures each comprise a superposition of relative movements. Details in this regard can be inferred, for example, from pages 76-77 and FIG. 3.5 of the book "Kegelräder; Grundlagen, Anwendungen [bevel gears; foundations, applications]," J. Klingelnberg, Springer-Verlag, 2008. The illustration style used in FIGS. 1A, 1B and in FIGS. 5A-5C is similar to that used in this book (see pages 292-295).

FIG. 3.5 of the cited book is contained in the drawings as FIG. 2. In FIG. 2, in addition to the gear cutting tool 10 (in the form of a cutterhead here) and the bevel gear workpiece 11, the virtual crown gear PR is also shown. The rolling procedure comprises a rotation of the gear cutting tool 10 around the tool spindle axis A1 (to generate a cutting movement) and a pivot or rotation around the roller rocking axis W1 (called rolling rotation here), which is coincident with the crown gear axis. The pivot or rotation around the roller rocking axis W1 is usually defined by a cradle angle range a. Moreover, a rotational movement of the bevel gear workpiece 11 around the workpiece spindle axis B is added.

The movements mentioned take place in three-dimensional space. The schematic illustrations as shown in FIGS. 1A, 1B can therefore only illustrate the fundamental aspects of such a process 1.

To be able to illustrate this procedure three-dimensionally, a perspective view of a bevel gear workpiece 11 (in the form of a pinion here) and a cup grinding wheel 10 is shown by way of example in FIG. 3. FIG. 3 shows a snapshot shortly before reaching the rolling end position WEP of the tooth gap 13. The tooth gaps 13 of the bevel gear workpiece 11 are ground in this example one after another from the heel F to the toe Z, i.e., the plunging P2 and P6 takes place for each tooth gap 13 in the region of the heel F at the profile rolling angle heel and the retraction movements P4, P8 take place for each tooth gap 13 in the region of the toe Z at the profile rolling angle toe.

However, the wear on the cup grinding wheel 10 is quite large during the above-described process 1 and the cup grinding wheel 10 has to be frequently dressed. Above all, it has been shown that the wear is large in the region of the profile head 12 (see FIGS. 1A, 1B) of the cup grinding wheel 10, since the greatest forces and loads occur here.

SUMMARY

It is an object to provide methods capable of making the rolling methods of the prior art more productive and reducing the wear on the cup grinding wheel or on the milling tool.

In one aspect, a method for gear cutting of bevel gear workpiece is performed in a gear cutting machine, wherein the method comprises a preliminary machining phase (for example, as rough machining) and a subsequent post-machining phase (for example, as finish machining). The preliminary machining phase and the post-machining phase both take place in the same chucking of the bevel gear workpiece here.

According to at least some embodiments, the preliminary machining phase comprises at least a single-stage (plunging) rolling method. The preliminary machining phase can also comprise a multistage (plunging) rolling method. This single-stage or multistage (plunging) rolling method is carried out to machine at least one tooth gap on the bevel gear workpiece by machining using a gear cutting tool. The rolling method of the preliminary machining phase may comprise at least one first machining procedure, in which a first relative infeed movement is carried out to move the gear cutting tool into a first starting position in relation to the bevel gear workpiece, the gear cutting tool is rotationally driven around a tool spindle axis of the gear cutting machine, the gear cutting tool penetrates in relation to the bevel gear workpiece, proceeding from the first starting position up to a first end position, into the material of the bevel gear workpiece, and in which the gear cutting tool and the bevel gear workpiece carry out a first rolling procedure in a first rolling range.

If the preliminary machining phase comprises a multistage (plunging) rolling method, in addition to the first machining procedure, it can comprise:

a second machining procedure, in which the gear cutting tool is rotationally driven (further) around the tool spindle axis of the gear cutting machine, the gear cutting tool penetrates into the material of the bevel gear workpiece in relation to the bevel gear workpiece, proceeding from a second starting position up to a second end position, and in which the gear cutting tool and the bevel gear workpiece carry out a second rolling procedure in a second rolling range, wherein the first rolling range and the second rolling range differ.

The post-machining phase comprises at least the following steps in some embodiments:

carrying out a further rolling procedure proceeding from a third (further) starting position, in order to post-machine at least one of the tooth gaps on the bevel gear workpiece using a gear cutting tool, wherein in the scope of this further rolling procedure, a rolling rotation is carried out in a third rolling range, wherein the first starting position of the first machining procedure has a different cradle angle than the third (further) starting position of the post-machining phase.

I.e., a different cradle angle is set before the post-machining phase than at the beginning of the first machining procedure.

In at least some embodiments, the third rolling range can comprise an incoming range and/or an outgoing range.

The gear cutting of bevel gear workpieces can comprise, according to at least some embodiments, the milling of gear teeth and the grinding of gear teeth on a bevel gear workpiece in a milling or grinding machine used as the gear cutting machine.

In at least some embodiments, the preliminary machining phase is used for the preliminary gear cutting or roughing of tooth gaps.

The preliminary gear cutting or roughing can be carried out, for example, in at least some embodiments using a milling tool (for example, using a bar cutterhead).

In at least some embodiments, the post-machining phase is used for the post-machining or finishing of tooth gaps, which were previously preliminarily gear cut or roughed.

The post-machining or finishing can be carried out, for example, in at least some embodiments using a grinding tool (for example, using a cup grinding wheel).

A combined rolling method is used in at least some embodiments, in which, in the scope of a preliminary machining phase (or preliminary gear cutting phase), the tooth gaps of the bevel gear workpiece are not completely rolled through. However, in the scope of the post-machining phase, the bevel gear workpiece is completely rolled through.

In at least some embodiments, a material allowance is left standing between the preliminary machining phase (or preliminary gear cutting phase) and the post-machining phase, which is then removed in the post-machining phase. The material allowance can be a depth allowance and/or a flank allowance.

The preliminary machining phase comprises a multistage (plunging) rolling method having at least different two machining procedures in at least some embodiments.

In at least some embodiments, every machining procedure of the preliminary machining phase comprises a relative movement, which is used to plunge or pierce the gear cutting tool into the bevel gear workpiece. I.e., material is removed on the bevel gear workpiece during this relative movement.

The plunging or piercing takes place in at least some embodiments so that the plunging end position is located in the material of the bevel gear workpiece. I.e., the gear cutting tool moves into the material of the bevel gear workpiece.

In at least some embodiments, every machining procedure of the preliminary machining phase comprises a rolling rotation, which comprises a rotation of the bevel gear workpiece in relation to the gear cutting tool within a rolling range.

The rolling rotation of a first machining procedure is performed in at least some embodiments, for example, in a first rolling range, while in contrast the rolling rotation of a second machining procedure, if one is provided, is performed in a second rolling range. The first rolling range differs in at least some embodiments from the second rolling range. Either the first rolling range is shorter than the second rolling range, or the first rolling range is longer than the second rolling range. The terms "shorter" or "longer" relate to an angle range or to a route which is rolled through.

The preliminary machining phase can comprise two different rolling procedures in at least some embodiments. Rolling procedures are referred to as different rolling procedures in the present context, which differ due to their starting positions and/or end positions, and/or in which the rolling procedures are of different lengths (for example, measured in degrees of the cradle angle), and/or are carried out with different depth infeeds of the gear cutting tool (for example, the cup grinding wheel or the cutterhead) in relation to the bevel gear workpiece, and/or which differ due to their starting positions and their rolling speeds or due to their end positions and their rolling speeds, and/or which do not, as is typical in the prior art, roll through completely from the rolling start (at the profile rolling angle toe or profile rolling angle heel) up to the rolling end (at the profile rolling angle heel or at the profile rolling angle toe). I.e., during the rolling procedure or procedures of the preliminary machining phase, neither the profile rolling angle toe nor the profile rolling angle heel is reached.

In at least some embodiments, the post-machining phase comprises a rolling procedure in which the profile rolling angle toe and the profile rolling angle heel are reached. I.e., the third rolling range can extend from the profile rolling angle toe up to the profile rolling angle heel or vice versa in at least some embodiments.

If the third rolling range comprises an incoming range and/or an outgoing range, the third rolling range can thus extend by a small amount beyond the profile rolling angle toe or the profile rolling angle heel.

The gear cutting is made more cost-effective by embodiments described herein.

In addition, a service life gain on the tool results.

This relates here in at least some aspects to the roughing of rolled tooth gaps and the subsequent finishing of rolled tooth gaps.

The preliminary machining phase can be carried out for the milling or grinding of tooth gaps on the solid material (i.e., on the material which is not previously gear cut) of the bevel gear workpiece.

The post-machining phase, in contrast, is performed on the previously gear cut tooth gaps of the bevel gear workpiece.

According to at least some embodiments, the allocation of the rolling of the preliminary machining phase into two or more than two rolling procedures can be used to reduce the (dynamic) load of the gear cutting tool (for example, the cup grinding wheel or the bar cutterhead) in the scope of a first rolling procedure and to provide nearly the final flank geometry on the bevel gear workpiece in the scope of a second rolling procedure. The final flank geometry is then generated in the scope of the post-machining phase.

According to at least some embodiments, the multistage plunging-rolling method of the preliminary machining phase comprises a step-by-step plunging into the material of the bevel gear workpiece (having two or more than two steps), in order to reduce the wear on the gear cutting tool.

In at least some embodiments, the first and second rolling procedures are rolling procedures having partial through rolling and the third rolling procedure is a rolling procedure having complete through rolling.

Partial through rolling refers here to a rolling procedure, which passes through a rolling range or rolling path which is shorter than the rolling range or rolling path of the complete through rolling (i.e., it does not roll through the complete profile rolling range), and/or in which the rolling procedure proceeds from a starting position which is located inside the profile rolling range.

According to at least some embodiments, the multistage plunging-rolling method can also comprise a change of the rotational velocity of the gear cutting tool and/or a change of the speed of the relative movement(s), to reduce the wear on the gear cutting tool and increase the efficiency of the method.

In at least some embodiments, for example, a change of the rolling speed can be performed during the rolling through a tooth gap. A rolling speed curve can be specified for this purpose.

In at least some embodiments, for example, a change of the plunging speed can be performed during the plunging into the material of the bevel gear workpiece. A plunging speed curve can be specified for this purpose in such embodiments.

This adaptation/change of the rolling speed during the rolling through a tooth gap can be performed here to reduce the wear on the gear cutting tool.

Embodiments disclosed herein can be used for the prototype manufacturing and small series manufacturing of bevel gears. However, the invention may also be technically and/or economically reasonable in other contexts and under other boundary conditions.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are understood not to be limiting, and are described in greater detail hereafter with reference to the drawings.

DETAILED DESCRIPTION

This relates to a method which was specially developed for milling or grinding gear teeth on a bevel gear workpiece 11 in a gear cutting machine 100.

Figure 5A:
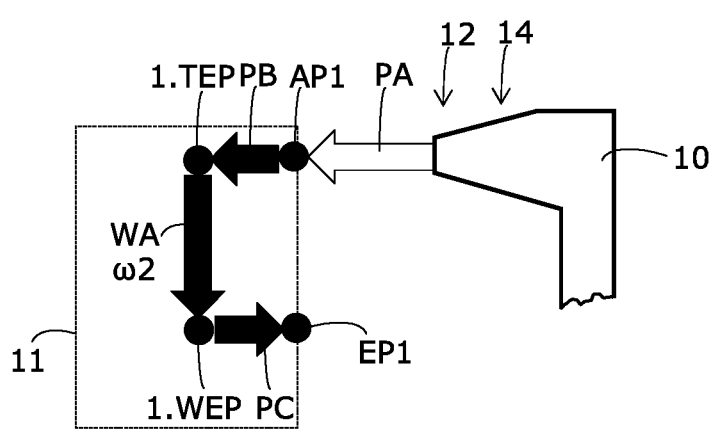
FIG. 5A schematically shows substeps of a first machining procedure.
Figure 5B:
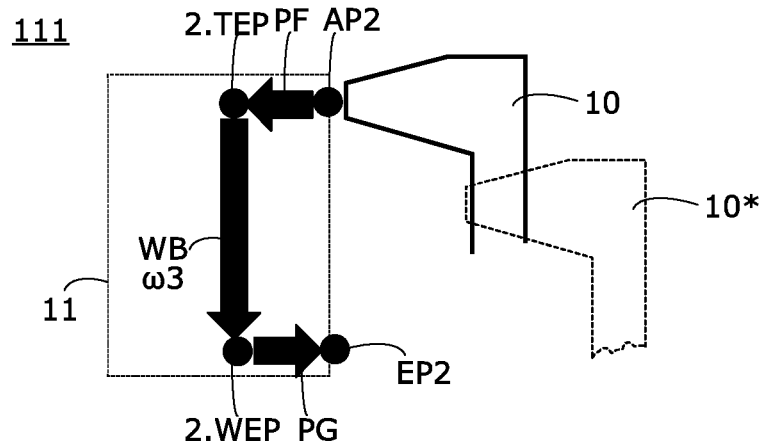
FIG. 5B schematically shows substeps of a second machining procedure.
Figure 5C:
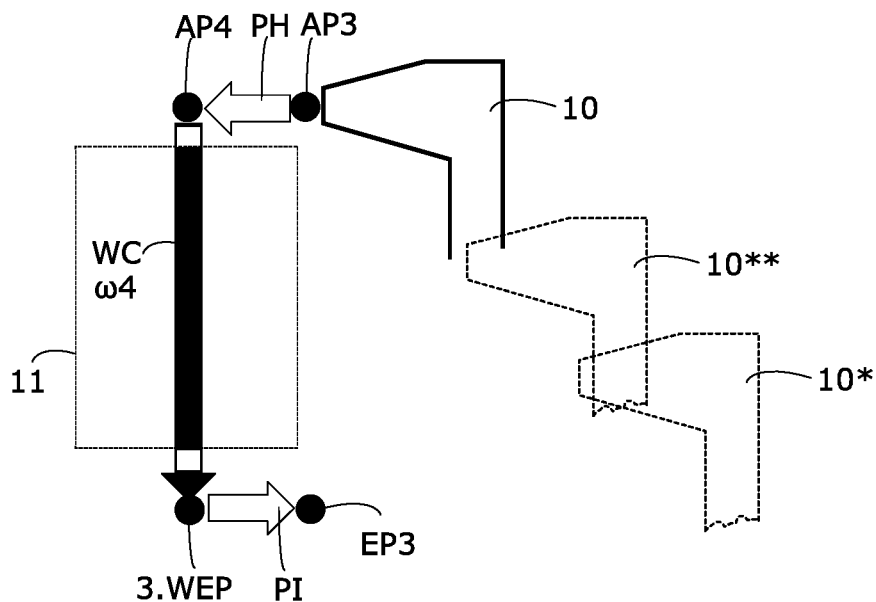
FIG. 5C schematically shows substeps of a post-machining phase.

Exemplary substeps of one embodiment of the method are shown in FIGS. 5A to 5C. These are methods here in which two machining procedures are carried out in the scope of the preliminary machining phase. The second machining procedure, which is shown in FIG. 5B, is optional.

Figure 6:
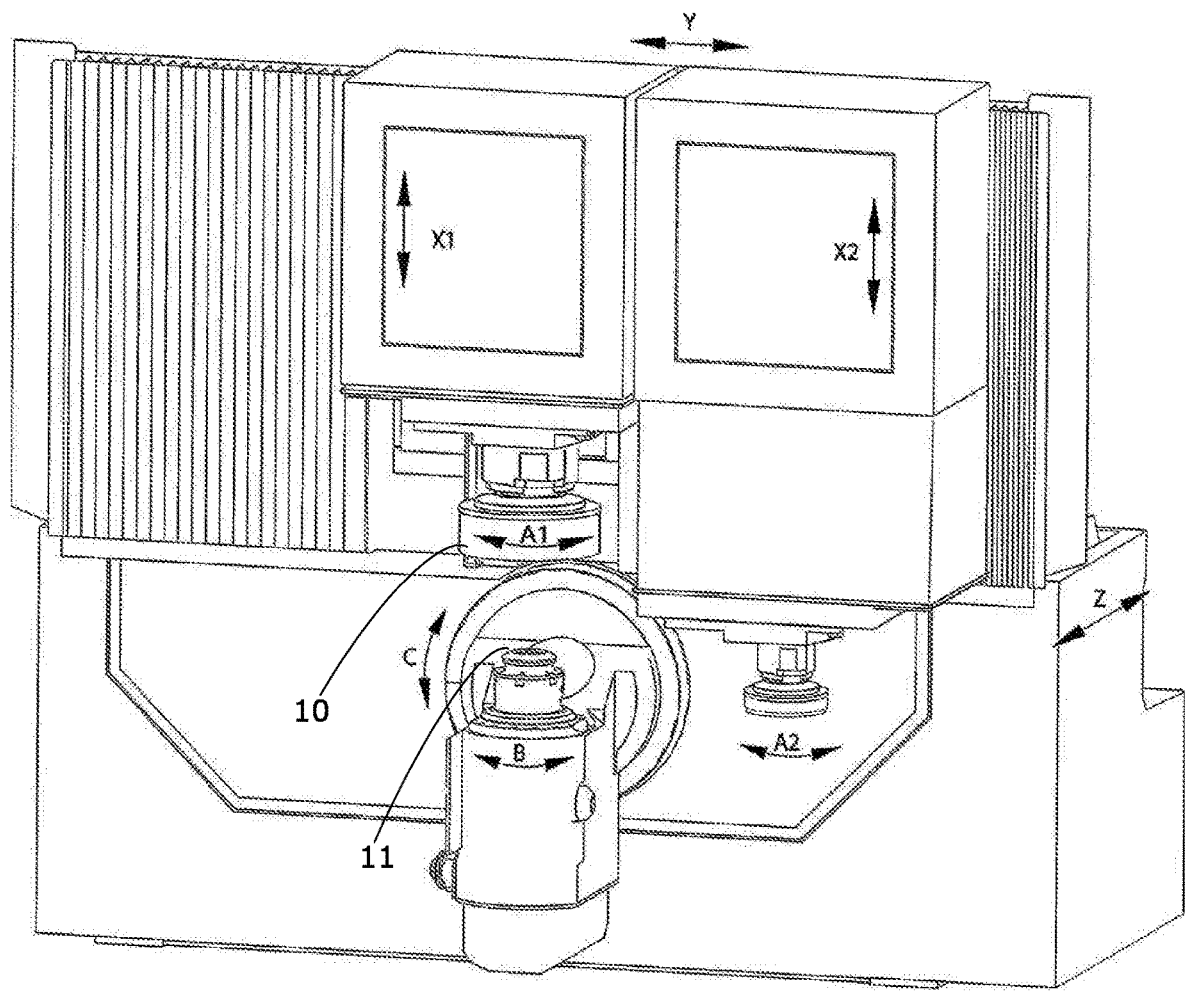
FIG. 6 shows a perspective view of a grinding machine in which methods disclosed herein can be used.

FIG. 6 shows a perspective view of a grinding machine 100, in which methods disclosed can be used. However, such methods can also be used in other gear cutting machines.

One embodiment of a method comprises the following steps, which are described with reference to FIGS. 5A to 5C. The illustration style of FIGS. 5A to 5C is similar to illustration styles used in the book mentioned above: "Kegelräder; Grundlagen, Anwendungen."

The method can begin with carrying out a relative infeed movement PA, to move a cup grinding wheel 10 (or another gear cutting tool 10) into a starting position AP1 in relation to the bevel gear workpiece 11. This starting position AP1 is defined, inter alia, by a first cradle angle α. Reference is generally made hereafter to gear cutting tools 10, even if a cup grinding wheel 10 is shown by way of example in the figures. Simultaneously or after reaching the starting position AP1, the gear cutting tool 10 is rotationally driven around a tool spindle axis A1 of the gear cutting machine 100. The relative infeed movement PA can take place using one or more axes of the gear cutting machine 100. The infeed movement PA can be a linear movement or it can follow a curved path. The infeed movement PA can also comprise multiple linear and/or curved movements.

The infeed movement PA is a nonproductive movement in at least some embodiments. The block arrow PA is therefore shown in white.

From the starting position AP1 in FIG. 5A, a plunging-rolling method of a first machining procedure 110 can begin in all embodiments, in order to generate at least one tooth gap 13 in the material of the bevel gear workpiece 11 by grinding or milling. This plunging-rolling method comprises at least the following partial processes. The use of the numerals "first," "second," etc. is not to define a chronological sequence. These numerals are rather used for simpler naming of the individual procedures.

In the scope of a first plunging procedure PB, the penetration of the gear cutting tool 10 into the material of the bevel gear workpiece 11 takes place. This is a productive first plunging procedure PB. The penetration begins at the starting position AP1 and occurs up to a first plunging end position 1.TEP. During the productive first plunging procedure PB, material is removed by grinding or milling, as shown in FIG. 5A by the black arrow PB. The first plunging procedure PB results from one or more relative movements of one or more axes of the gear cutting machine 100. The first plunging procedure PB can be a linear movement or it can follow a curved path. The first plunging procedure PB can also comprise multiple linear and/or curved movements.

Figure 1A:
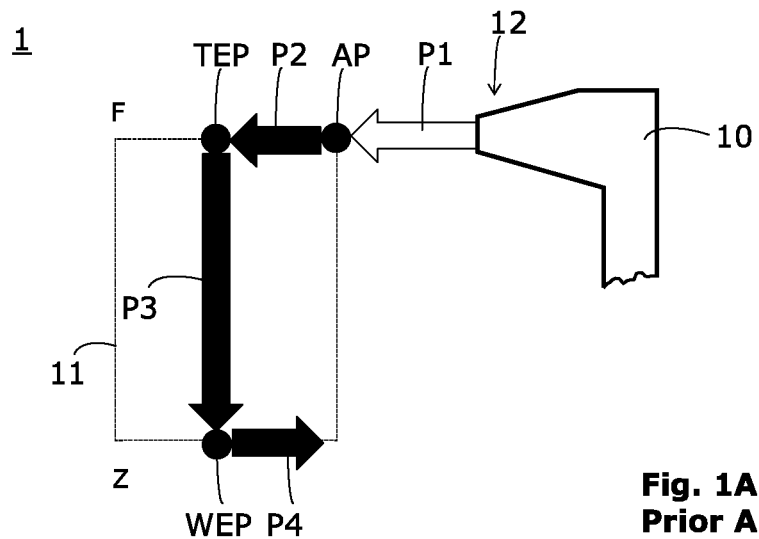
FIG. 1A schematically shows a known method for the preliminary machining of rolled tooth gaps.
Figure 1B:
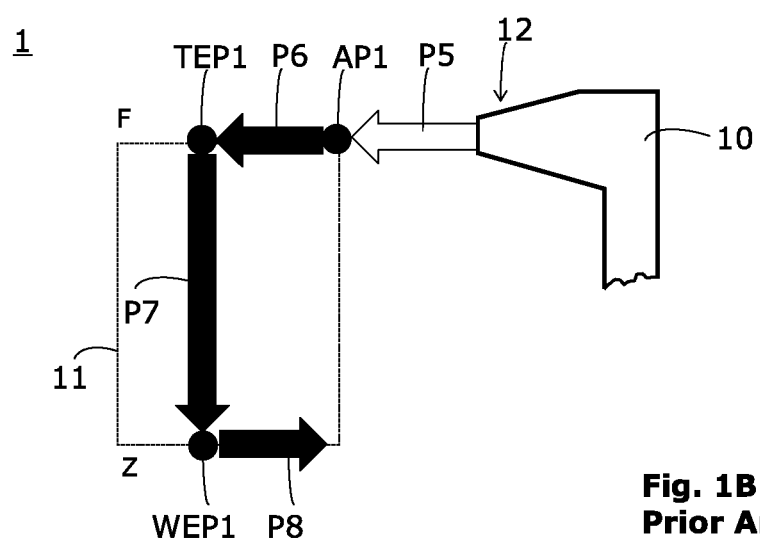
FIG. 1B schematically shows the method of FIG. 1A, which is used for the post-machining of the rolled tooth gaps.
Figure 2:
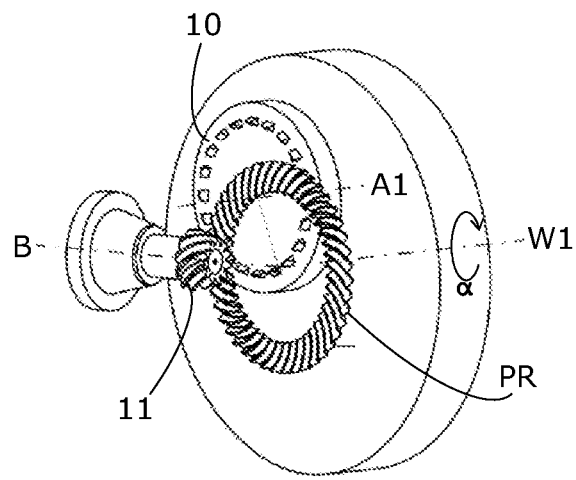
FIG. 2 schematically shows a virtual crown gear of a bevel gear gear cutting machine together with a bevel gear workpiece and a gear cutting tool, as is known.
Figure 3:
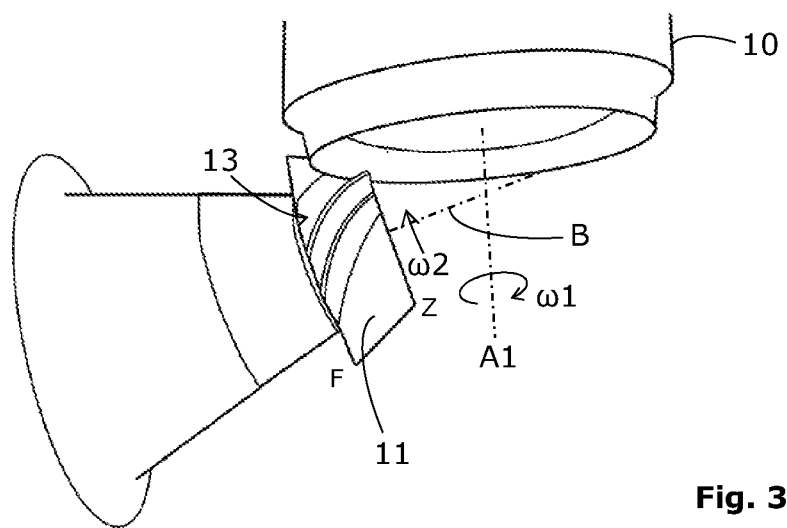
FIG. 3 schematically shows a perspective view of a known depth grinding method of a bevel gear pinion.
Figure 4:
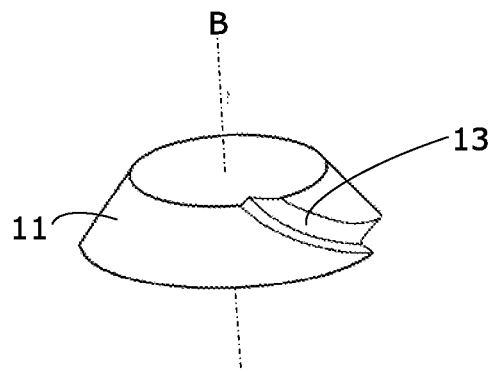
FIG. 4 schematically shows a perspective view of a known bevel gear pinion and a tooth gap which was generated on this bevel gear pinion.

Now, for example, as shown in FIG. 5A, a first rolling procedure WA can follow, in which the gear cutting tool 10 and the bevel gear workpiece 11 execute relative movements having superimposed rolling rotation ω2. A corresponding rolling rotation ω2 is shown in FIG. 3 by way of example. The rolling rotation ω2, as is used here relates to a rotational movement of the bevel gear workpiece 11 around the workpiece spindle axis B. The relative movements of the rolling procedure WA having superimposed rolling rotation ω2 result in a complex three-dimensional movement of the gear cutting tool 10 in relation to the bevel gear workpiece 11. In FIG. 5A, this complex movement sequence is symbolized by the black arrow WA. At the end of the rolling procedure WA, a first rolling end position 1. WEP is reached.

For example, in FIG. 5A, a relative withdrawal movement PC can take place up to a first end position EP1. This withdrawal movement PC can be a linear movement or it can follow a curved path. The withdrawal movement PC can also comprise multiple linear and/or curved movements. The withdrawal movement PC can also result from one or more relative movements of one or more axes of the gear cutting machine 100.

The withdrawal movement PC can be a productive or nonproductive movement.

The further steps, which can be carried out in the scope of the preliminary machining phase on the same tooth gap 13 as the steps of FIG. 5A, are shown in FIG. 5B. This procedure is referred to here as gap-by-gap machining, since every gear 13 of the bevel gear workpiece 11 is subjected to all substeps of FIGS. 5A and 5B, before a next tooth gap is pre-machined accordingly. The substeps of FIG. 5B are optional. The method can therefore also pass directly to the steps of FIG. 5C after the execution of the steps of FIG. 5A.

However, it is also possible to perform an indexing rotation of the bevel gear workpiece 11 around the workpiece spindle axis B after the steps of FIG. 5A, in order to preliminarily machine a next tooth gap 13 of the bevel gear workpiece 11 according to FIG. 5A. This procedure can be repeated until all tooth gaps 13 have been preliminarily machined according to FIG. 5A. The steps of FIG. 5B or also the steps of FIG. 5C directly can then follow tooth gap 13 by tooth gap 13. This procedure is referred to here as gap-spanning.

However, it is also possible to carry out the steps of FIG. 5B after the steps of FIG. 5A on the tooth gap 13 which was previously subjected to the steps of FIG. 5A. In this case, an indexing rotation of the bevel gear workpiece 11 around the axis B first takes place after the steps of FIG. 5B.

However, it is also possible to carry out the steps of FIG. 5C after the steps of FIG. 5A and the steps of FIG. 5B, before an indexing rotation of the bevel gear workpiece 11 take place around the axis B, in order to carry out the steps of FIGS. 5A to 5C on a next tooth gap 13.

As shown in FIG. 5B, a relative plunging or piercing movement PF can be carried out in the scope of an optional second machining procedure 111, in order to cause the gear cutting tool 10 to penetrate into the material in relation to the bevel gear workpiece 11 from a second starting position AP2 up to a further plunging end position 2.TEP. This plunging or piercing movement PF can be a linear movement or a can follow a curved path. It can also comprise multiple linear and/or curved movements. The movement PF can also result from one or more relative movements of one or more axes of the gear cutting machine 100.

Now, for example, as shown in FIG. 5B, a second rolling procedure WB can follow, in which the gear cutting tool 10 and the bevel gear workpiece 11 execute the relative movements of a rolling procedure with overlaid rolling rotation ω3. The second rolling procedure WB is longer in the exemplary embodiment shown than the first rolling procedure WA, as indicated by the block arrows WA and WB of different lengths. The first rolling procedure WA can also be longer than the second rolling procedure WB, however.

The corresponding relative movements with overlaid rolling rotation ω3 result in a complex three-dimensional movement of the gear cutting tool 10 in relation to the bevel gear workpiece 11. This complex movement sequence is symbolized by the black arrow WB in FIG. 5B. At the end of the rolling procedure WB, a second rolling end position 2.WEP is reached.

At least some embodiments comprise at least two different rolling procedures WA and WB. Rolling procedures are referred to as different rolling procedures WA and WB in the present context,
- which differ due to their starting positions (1.TEP, 2.TEP) and/or end positions (1.WEP, 2.WEP), and/or
- in which the rolling procedures WA, WB are of different lengths (for example, measured in degrees of the cradle angle α), and/or
- which are carried out with different depth infeeds PB, PF of the gear cutting tool 10 (for example, the cup grinder wheel) in relation to the bevel gear workpiece 11 (i.e., the arrow PF is longer, for example, than the arrow PB), and/or
- which differ due to their starting positions (1.TEP, 2.TEP) and their rolling speeds or due to their end positions (1.WEP, 2.WEP) and their rolling speeds, and/or
- which do not roll through completely from a rolling start AP4 up to the rolling end 3.WEP, as is typical in the prior art, as takes place in the post-machining phase 112 (see FIG. 5C).

Now, for example, as shown in FIG. 5B, a relative withdrawal movement PG can take place up to a second end position EP2.

In at least some embodiments, the withdrawal movement PG can be a linear movement or it can follow a curved path. The withdrawal movement PG can also comprise multiple linear and/or curved movements. The movement PG can also result from one or more relative movements of one or more axes of the gear cutting machine 100.

The withdrawal movement PG can be a productive or nonproductive movement in all embodiments.

In the case of a gap-by-gap machining, the post-machining 112 of FIG. 5C now takes place.

As shown in FIG. 5C, the post-machining phase 112 comprises a movement PH in at least some embodiments, to infeed the gear cutting tool 10 in relation to the bevel gear workpiece 11, for example, from a third starting position AP3 up to a fourth starting position AP4 outside the material. This third starting position AP3 differs from the first starting position AP1 due to the cradle angle α. I.e., the rolling procedure WC of the post-machining phase 112 proceeds from a different cradle angle α than the rolling procedure WA.

This movement PH can be a linear movement or it can follow a curved path. It can also comprise multiple linear and/or curved movements. The movement PH can also result from one or more relative movements of one or more axes of the gear cutting machine 100.

In at least some embodiments, for example, as shown in FIG. 5C, a third rolling procedure WC can follow, in which the gear cutting tool 10 and the bevel gear workpiece 11 execute relative movements having overlaid rolling rotation ω4. The third rolling procedure WC is longer in the example shown in the first rolling procedure WA (and than the second optional rolling procedure WB) as indicated by the block arrows WA, WB, and WC of different lengths. Complete rolling through of the corresponding tooth gap 13 takes place in the scope of the third rolling procedure WC.

The third rolling range can comprise an incoming range and/or an outgoing range. To be able to show this in FIG. 5C, the black block arrow WC at the rolling start (on top in FIG. 5C) and at the rolling end (at the bottom in FIG. 5C) has a white region in each case. It is thus to be shown that the entire rolling procedure WC does not have to be productive.

In comparison to FIGS. 5A, 5B, and 5C, it can also be seen that the gear cutting tool 10 can be located in different starting positions in each case in relation to the bevel gear workpiece 11. The gear cutting tool is provided with the reference sign 10* in the position of FIG. 5A in FIG. 5B and FIG. 5C. The gear cutting tool is provided with the reference sign 10** in the position of FIG. 5B in FIG. 5C. This type of illustration is solely schematic in nature and is to serve for better comprehension.

In addition, a portion of the material of the bevel gear workpiece 11 is schematically indicated in FIGS. 5A, 5B, and 5C. This illustration of the bevel gear workpiece 11 is also solely schematic in nature and is to serve for better comprehension.

In the case of gap-by-gap machining, after the steps of FIG. 5C, an indexing rotation of the bevel gear workpiece 11 takes place and the method of FIGS. 5A and 5C or FIGS. 5A, 5B, and 5C is repeated after reaching the next starting position AP1 with the step PB.

In the examples which are shown and described here, it is to be noted that at least a part of the mentioned movements can run in overlaid form.

The first rolling procedure WA can begin, for example, even before reaching the first plunging end position 1.TEP, to mention only one example.

The first rolling procedure WA can be stopped, for example, even before reaching the position 1.WEP, to mention a further example.

The second rolling procedure WB, if provided, can begin, for example, even before reaching the second plunging end position 2.TEP, to mention only one example.

The second rolling procedure WB, if provided, can be stopped, for example, even before reaching the position 2.WEP, to mention a further example.

The grinding or cutting conditions on the gear cutting tool 10 can be optimized on the basis of an allocation of the steps into multiple substeps or rolling procedures. In the method of FIGS. 5A and 5B, a part of the removal ability is transferred from the profile head 12 of the cup grinding wheel 10 to the side flanks 14 (see FIG. 5A) of the cup grinding wheel 10.

At least some embodiments comprise at least one relative infeed movement (for example, PA in FIG. 5A) to move the gear cutting tool 10 into a starting position (for example, AP1 in FIG. 5A) in relation to the bevel gear workpiece 11. This starting position is associated with a first cradle angle α. Simultaneously or after reaching the corresponding starting position, the gear cutting tool 10 is rotationally driven around the tool spindle axis A1 of the grinding machine 10 (called rotational velocity ω1), in order to reach the required cutting speed. The gear cutting tool 10 can also be continuously rotationally driven from the beginning of the method to the end of the method (at uniform speed or at variable speed) to prevent starting and decelerating multiple times.

The relative movement can be performed using one or more axes of the gear cutting machine 100.

The relative movement can be a linear movement or it can follow a curved path. The relative movements can also comprise multiple linear and/or curved movements.

The preliminary machining phase can optionally comprise a step-by-step plunging into the material of the bevel gear workpiece 11, to reduce the wear on the gear cutting tool 10. In this case, reference is made to a multistage preliminary machining phase.

The multistage preliminary machining phase can also comprise a change of the rotational velocity ω1 of the gear cutting tool and/or a change of the speed of the relative movement(s) to reduce the wear and increase the efficiency of the method.

As already described, the multistage plunging-rolling method of the preliminary machining phase can be carried out separately for the generation of each tooth gap 13 of the bevel gear workpiece 11, wherein the bevel gear workpiece 11 carries out an indexing rotation around the workpiece spindle axis B of the gear cutting machine 100 in each case, before a further tooth gap 13 of the bevel gear workpiece 11 is generated by the renewed execution of the subprocesses of the multistage preliminary machining phase.

The subprocesses of the multistage preliminary machining phase can also be carried out in a gap-spanning manner, however.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising:
   cutting a bevel gear workpiece in a gear cutting machine, including:
   (a) executing a preliminary machining phase comprising
      performing a rolling procedure and machining therewith at least one tooth gap on the bevel gear workpiece using a rotationally-driven gear cutting tool, wherein the rolling procedure includes performing at least one first machining procedure comprising
      performing a first relative infeed movement moving the gear cutting tool into a first starting position relative to the bevel gear workpiece,
      penetrating the gear cutting tool into material of the bevel gear workpiece relative to the bevel gear workpiece from the first starting position to a first ending position, and
      performing a first rolling procedure in a first rolling range with the gear cutting tool and the bevel gear workpiece,
      wherein a material allowance remains on the bevel gear workpiece after the preliminary machining phase; and
   (b) executing a post-machining phase comprising
      performing a further rolling procedure proceeding from a further starting position and post-machining therewith at least one of the at least one tooth gap on the bevel gear workpiece using the rotationally-driven gear cutting tool or using another rotationally-driven gear cutting tool, including performing a rolling rotation in a further rolling range, wherein the first starting position defines a cradle angle and the further starting position defines a different cradle angle,
      and further including removing the material allowance and generating a final flank geometry.

2. A method according to claim 1, wherein executing the preliminary machining phase includes performing a second machining procedure comprising
   penetrating the gear cutting tool into the material of the bevel gear workpiece relative to the bevel gear workpiece from a second starting position to a second ending position, and
   performing, with the gear cutting tool and the bevel gear workpiece, a second rolling procedure in a second rolling range that differs from the first rolling procedure.

3. A method according to claim 2, wherein the first rolling procedure and the second rolling procedure each including performing partial through rolling and the further rolling procedure includes performing complete through rolling.

4. A method according to claim 2, wherein performing the second machining procedure includes performing a second relative infeed movement moving the gear cutting tool into the second starting position relative to the bevel gear workpiece.

5. A method according to claim 2, wherein performing the rolling procedure includes performing a multistage plunging-rolling method, wherein performing the at least one first machining procedure includes performing a first productive plunging movement from the first starting position to the first ending position, and performing the second machining procedure includes performing a second productive plunging movement from the second starting position up to the second end position.

6. A method according to claim 1, including performing the first rolling procedure in a first cradle angle range and performing the further rolling procedure in a second cradle angle range that is different from the first cradle angle range.

7. A method according to claim 1, wherein the material allowance remains on the at least one tooth gap of the bevel gear workpiece after the first rolling procedure, and the step of removing said material allowance is performed during the step of performing the further rolling procedure.

8. A method according to claim 1, including (i) performing the at least one first machining procedure with respect to every of the at least one tooth gap on the bevel gear workpiece in a gap-by-gap manner; and (ii) at a time after completing step (i), performing the further rolling procedure in a gap-by-gap manner.

9. A method according to claim 1 comprising performing the method in a gap-spanning manner.

10. A method according to claim 1, wherein the machining step includes generating the at least one tooth gap from solid material of the bevel gear workpiece during the step of performing the at least one first machining procedure.

11. A method according to claim 10, wherein the solid material of the bevel gear workpiece is not hardened prior to the step of performing the at least one first machining procedure.

12. A method according claim 1, wherein the machining step includes grinding or milling of the at least one tooth gap.

13. A method according to claim 1, wherein the further rolling range is greater than the first rolling range.

14. A method according to claim 2, including performing the first rolling procedure in a first cradle angle range and performing the further rolling procedure in a second cradle angle range that is different from the first cradle angle range.

15. A method according to claim 2, wherein the material allowance remains on the at least one tooth gap of the bevel gear workpiece after the first rolling procedure, and the step of removing said material allowance is performed during the step of performing the further rolling procedure.

16. A method according claim 2, wherein the machining step includes grinding or milling of the at least one tooth gap.

17. A method according to claim 3, including performing the first rolling procedure in a first cradle angle range and performing the further rolling procedure in a second cradle angle range that is different from the first cradle angle range.

18. A method according to claim 3, wherein the material allowance remains on the at least one tooth gap of the bevel gear workpiece after the first rolling procedure, and the step of removing said material allowance is performed during the step of performing the further rolling procedure.

* * * * *